(12) United States Patent
Pick et al.

(10) Patent No.: US 7,963,183 B2
(45) Date of Patent: Jun. 21, 2011

(54) SEQUENTIAL TRANSMISSION SHIFT SYSTEM

(75) Inventors: Dean Pick, Vancouver (CA); Thomas Dowad, Christina Lake (CA)

(73) Assignee: Dean Pick, Vancouver BC (CA)

( * ) Notice: Subject to any disclaimer, the term of this patent is extended or adjusted under 35 U.S.C. 154(b) by 325 days.

(21) Appl. No.: 12/418,820

(22) Filed: Apr. 6, 2009

(65) Prior Publication Data

US 2010/0251846 A1    Oct. 7, 2010

(51) Int. Cl.
*F16H 59/14* (2006.01)
(52) U.S. Cl. .......................................................... 74/337
(58) Field of Classification Search ....................... 74/337
See application file for complete search history.

(56) References Cited

U.S. PATENT DOCUMENTS

| 4,664,217 | A | 5/1987 | Welch et al. |
| 5,368,279 | A * | 11/1994 | Ottemann et al. ............ 254/342 |
| 5,542,309 | A | 8/1996 | Wenger et al. |
| 5,967,939 | A | 10/1999 | Reik et al. |
| 6,085,607 | A | 7/2000 | Narita et al. |
| 6,220,109 | B1 | 4/2001 | Fisher et al. |
| 6,230,577 | B1 | 5/2001 | Showalter et al. |
| 6,370,976 | B1 | 4/2002 | Doppling et al. |
| 6,439,362 | B2 | 8/2002 | Reik et al. |
| 6,725,737 | B2 | 4/2004 | Baasch et al. |
| 6,893,371 | B2 | 5/2005 | Mills et al. |
| 7,669,496 | B2 * | 3/2010 | Takahashi ..................... 74/337 |
| 2008/0015086 | A1 | 1/2008 | Ketteler et al. |

FOREIGN PATENT DOCUMENTS

WO    WO 2004/065825    8/2004

* cited by examiner

*Primary Examiner* — Edwin A Young
(74) *Attorney, Agent, or Firm* — Renner, Kenner, Greive, Bobak, Taylor & Weber

(57) ABSTRACT

An apparatus for controlling a sequential transmission of a vehicle is provided comprising a control motor that drives a selector drum for shifting gears wherein the apparatus measures torque applied to or position of the selector drum and controls the control motor to engage the gears, to accommodate for wear and transient gear interference or jamming.

25 Claims, 6 Drawing Sheets

SEQUENTIAL TRANSMISSION SHIFT SYSTEM

FIELD OF THE INVENTION

The present invention relates to an apparatus and system for controlling a sequential transmission using a control motor and sensors to shift gears.

BACKGROUND OF THE INVENTION

A transmission is used to transmit power from an engine to a drive mechanism. The transmission uses the principle of mechanical advantage to convert the rotational speed, direction, and torque of a driving element into a different rotational speed, direction, and torque of a driven element. Most transmissions use a combination of gears in differing ratios to achieve this speed-torque conversion.

Vehicle transmissions often include more than one set of gear ratios (typically called "gears") to allow the vehicle to operate in a variety of conditions. When the vehicle is at rest or travelling at a low speed, a gear ratio may be selected to deliver relatively high torque from the engine to the driveline. When the vehicle is travelling at higher speeds, a different ratio may be used to deliver higher rotational speeds at lower torque to the driveline. Gear ratio may be selected to optimize the delivery of power to the driveline having regard to the characteristics of the engine, and in particular, to the engine's delivery of power as a function of the engine's rotational speed. Changing the gear ratio of a transmission is commonly known as shifting or changing gears, and typically requires a brief decoupling of the engine from the driveline using a clutch arrangement.

A typical vehicle transmission as exemplified in FIG. 1 may include an input shaft 101 which is driven by the engine through a clutching arrangement, and an output shaft 102 which may drive the driveline when a gear is selected. The input shaft 101 typically passes through a number of input gears 110. The output shaft 102 in this arrangement may pass through a number of corresponding output gears 109 which mesh with the input gears 110, each pair of meshed gears being a gear set. In each gear set, one of the gears is not directly affixed to the input or output shaft, and may spin independently of the shaft when not engaged, and the other is affixed to the input or output shaft. Adjacent to the each free spinning gear 111, a sliding gear 108 may be mounted on the shaft passing through that free spinning gear 111. Each sliding gear 108 may slide along the length of the shaft, but otherwise engage the shaft so that it rotates along with the shaft. Each free spinning gear 111 may have dog teeth which engage with the adjacent sliding gear 108 when the sliding gear 108 is slid along the shaft. The sliding gear 108 engages and rotates the free spinning gear 111 with the corresponding shaft, thereby selecting a gear. Once engaged, the output shaft 102 is driven by the input shaft 101 in a ratio determined by the selected gear.

Although this is a common implementation of a vehicle transmission, there are many variations which achieve the same function in a similar manner.

Some vehicles use a sequential transmission, which is a transmission having at least two sets of gears which must be selected in a predetermined order during shifting. If a vehicle has three gears, the sequential transmission cannot be shifted from any one gear set to any other gear set. It must be shifted in an order which is determined by the configuration of the gear changing mechanism.

In a sequential transmission implemented on the typical vehicle transmission described above as exemplified in FIG. 1, the sliding gears 108, are moved by selector forks 106 that slidably engage a selector fork shaft 107 which is aligned parallel to a selector drum 104. Typically, there are grooves 105, wedges or ridges on a selector drum 104 which engage the selector forks 106 and convert the rotation of the selector drum 104 into lateral movement of the selector forks 106 along the selector fork shaft 107 in a direction parallel to the input shaft 101 and output shaft 102, thereby moving the sliding gears 108 along the input shaft 101 or output shaft 102. The use of a selector drum 104 to select gears in this arrangement forces the operator to shift gears in order. Gear dog teeth 112 located on the side of sliding gears 108 are used to engage gear dog windows 113 located on the common side of the free spinning gear 111. This engagement effectively locks the free spinning gear 111 to the shaft running through its hub and permits torque to be transmitted from the input shaft 101 to the output shaft 102 through the free spinning gear 111 and its meshing gear 119.

Sequential transmissions are preferred in certain applications over other types of transmissions because of the relative simplicity of the apparatus. A typical sequential transmission has fewer moving parts and is generally more reliable than a comparable fully manual non-sequential transmission. They can often be made smaller and lighter than other comparable designs, and can be faster to complete gear shifts. They are often employed in automotive racing and motorcycle applications for these reasons.

Many sequential transmissions are driven manually by the operator using hand or foot levers that may rotate the selector drum 104 through a ratcheting arrangement 114. This allows the operator to rotate the selector drum 104 enough to cause the shift, but helps prevent the operator from rotating the selector shaft too far. When implemented on a motorcycle, the sequential transmission may include an indexer arrangement, such as a cam indexer 116. The indexing arrangement may include a cam sprocket 115 connected to the selector drum 104 in combination with a pawl or cam follower 118 that engages depressions in the cam sprocket 115 as the selector drum 104 is rotated. The cam follower 118 may have a wheel 117 at one end which may roll along the cam sprocket 115, and may be biased so that the wheel 117 maintains contact with the cam sprocket 115. When the cam follower 118 is seated in a depression, the selector drum 104 has been rotated to a position where a gear is engaged. By applying force to a shift lever attached to the ratcheting arrangement 114, the operator may rotate the selector drum 104 if the force is sufficient to unseat the cam follower 118 from the depression and overcome friction forces. As the selector drum 104 rotates, the cam follower 118 will move into an adjacent depression on the cam sprocket 115.

Automatic and Semiautomatic Configurations

Any sequential transmission systems known in the art may be operated by automatic or semi-automatic control means. These automatic or semi-automatic controllers typically include an electrical or electronic control system that may be programmable, and a control mechanism which may include buttons, levers or switches that may be operated by the vehicle operator. In a fully automatic configuration the shifting of the transmission is performed entirely by the controller in response to external conditions, engine speed, current gear in which the transmission is operating and other factors such as whether the operator is braking or accelerating. Such an automatic transmission will shift up and down through the gears as the operator attempts to accelerate or decelerate the vehicle.

There are a number of transmission systems for sequential controllers that include a control motor or other drive means directly connected to the selector drum allowing the controller to drive the selector shaft and thereby shift the transmission from one gear set to another gear set in response to its programming. Many configurations for such control motor driven sequential transmissions have been disclosed in the prior art. Some describe a motor coupled to a sequential transmission using a set of gears to increase the electrical motor torque and reduce the speed. Some prior art configurations show a selector shaft gear system being implemented as a worm gear arrangement.

Semi-automatic and automatic transmission systems may use one or a number of sensors in order to determine the status of the transmission, such as what gear it is in, the position of the control motor and/or the position of the selector drum. The control system for such systems initiates a shift or prevents a shift from occurring under certain circumstances in response to the sensory inputs. For example, a control system could be aware of the current gear of the transmission and how far and how long it needs to operate the control motor to shift the system into an adjacent gear.

One problem with such systems is that the system must be calibrated when assembled to pre-select the particular positions for each gear relative to the motor. Once the pre-selected gear positions are programmed into the system, the system will typically drive the control motor to the pre-selected gear position. This can pose difficulties in operation because the transmission wears over time and may expand or contract as a result of external temperature changes, and so the exact position to shift the transmission into an adjacent gear may change over time and with such external conditions.

Some existing sequential transmission systems incorporate mechanical means (such as springs or biasing means) to accommodate variances in shift position due to wear and temperature changes. The incorporation of a control motor and control system in such systems typically leads to further losses in precision as the motor system may load these dynamic elements while attempting to perform the shift, which may prevent the shift from completing or interfere with sensing when a shift has been completed.

Another difficulty with electronically controlled motor driven transmission systems is that such systems typically perform poorly when detecting and responding to interference between the gear dogs during shifting. Commonly known as gear jam, the problem occurs when the leading edge of a gear dog belonging to a sliding gear is brought against the leading edge of the gear dog belonging to the corresponding free spinning gear. Under these conditions the gears may not fully engage or may resist engaging and the shift attempt will fail. Many modern transmissions incorporate a synchronizer mechanism, commonly known as a synchromesh device, to enable gear engagement, however these devices add to the size, weight, and cost of the transmission. In the absence of a synchromesh device, if the control system does not sense such interference conditions, it will continue to drive the motor generating excessive strain on the elements of the system. Under those circumstances the transmission, the control motor, or both may be damaged. Since a shift of a sequential transmission may occur in a short period of time (e.g. less than one hundredth of a second), any control system would have to be equipped with sensors that detect interference conditions quickly and accurately.

There is a need for a semi-automatic or automatic sequential shift system that detects the in-gear position of the selector shaft and calibrates the controller to adjust for short term changes in temperature and long term changes due to wear and tear. There is a need for control systems for motor controlled sequential transmissions that can quickly detect gear jams and accurately react to permit gear engagement without risking damage to the engine.

SUMMARY OF THE INVENTION

The present invention relates to an apparatus for controlling a sequential transmission of a vehicle, the transmission comprising an input shaft, an output shaft, at least two sets of gears which are selectively engageable, and a selector drum that when rotated selects a set of gears which engage to drive the output shaft from the input shaft, the apparatus comprising a control motor which is mechanically connected to the selector drum to rotate the selector drum when actuated, a torque sensor which senses the torque applied to the selector drum by the control motor, and a controller which controls the motor based on signals received from the torque sensor.

The apparatus may also include the feature wherein the torque sensor comprises a current sensor that monitors the current drawn by the control motor, and the controller detects a change in the current draw of the control motor during operation of the control motor as an indication of gear jam and adjusts the control motor in response to the change in the current draw.

The apparatus may include a plurality of selector drums, each independently actuated by a control motor to selectively engage sets of gears.

BRIEF DESCRIPTION OF THE DRAWINGS

Embodiments of the invention will be described by way of example and with reference to the drawings in which.

DETAILED DESCRIPTION OF THE INVENTION

Figure 1:
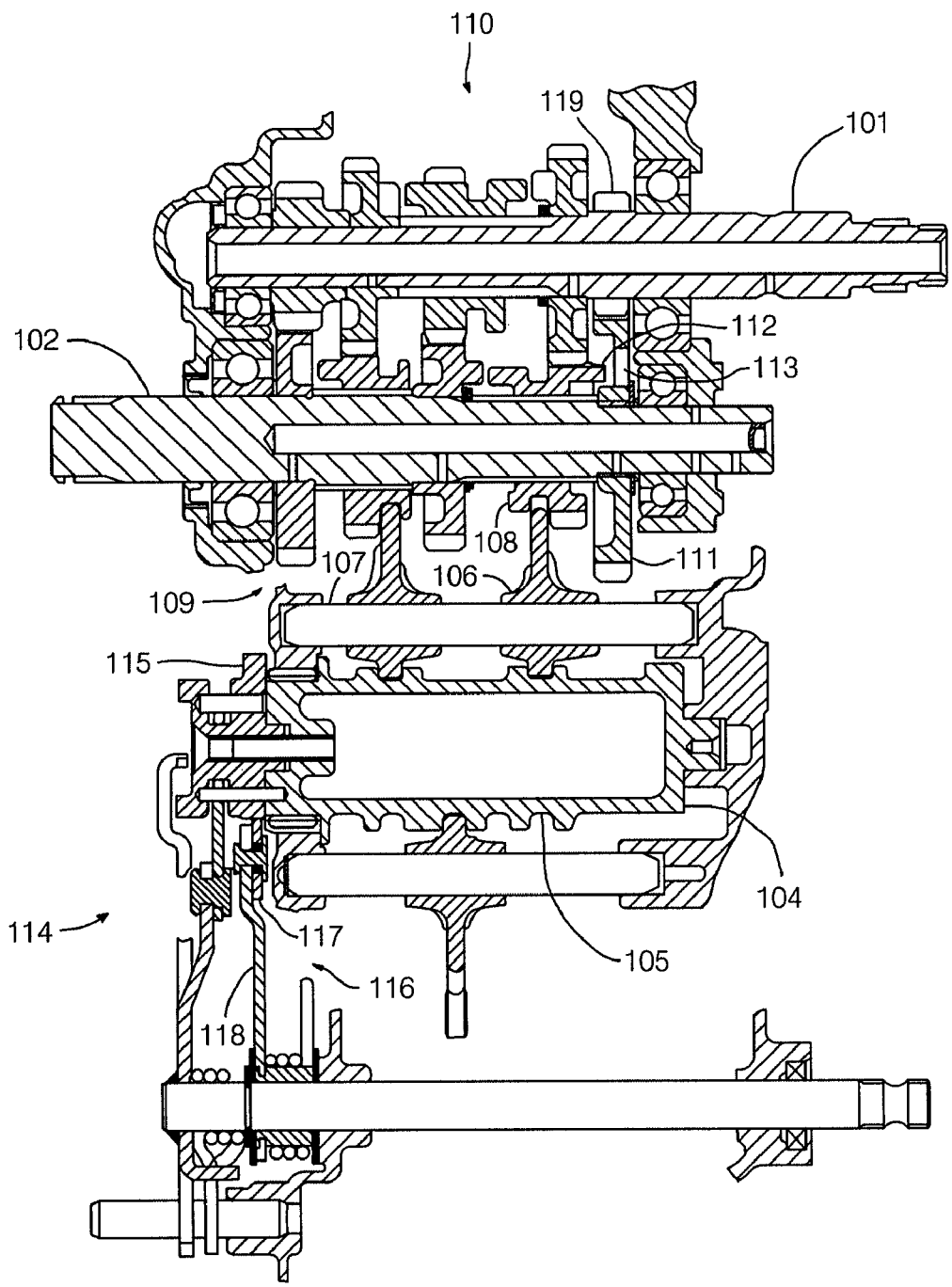
FIG. 1 is a top sectional view of a prior art sequential transmission for a motorcycle.
Figure 2:
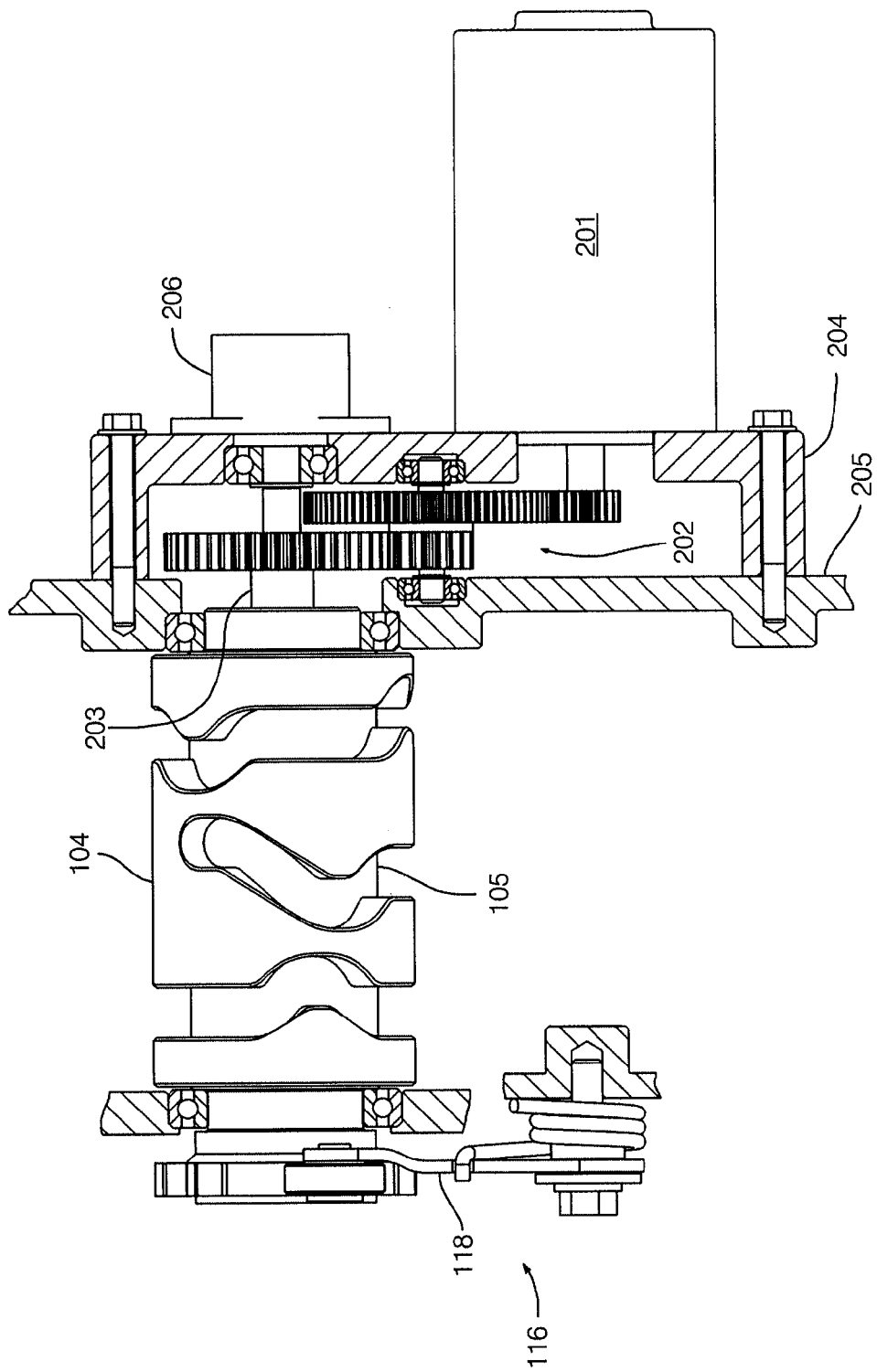
FIG. 2 is a top view of an embodiment of the invention depicting a control motor driving the selector drum through a geartrain.

FIG. 2 shows one embodiment of the invention comprising a control motor 201 driving the selector drum 104. A cam indexer 116 having a series of impressions therein biases the selector drum 104 into a fixed number of gear positions using a biased pawl 118. The control motor 201 may drive the selector shaft 203 through a series of selector shaft gears 202. The control motor 201 may incorporate a position sensor, such as a Hall effect sensor, to determine the position of the control motor 201.

The selector shaft gears 202 may include spur gears, bevel gears, helical gears and hypoid gears. In a preferred embodiment the selector shaft gears 202 would not include a worm drive arrangement, as worm gear arrangements are typically poor mechanical transmitters of reverse torque, and therefore may not provide good feedback to a torque sensor. Worm gears are helical gears having a helix angle that does not exceed 50 degrees.

The invention may also comprise a position sensor 206 in addition to or instead of the position sensor in the control motor 201, which may incorporate a Hall effect sensor or other current sensing means that encompasses or encircles or is immediately adjacent to the selector shaft 203 or selector drum 104. The position sensor 206 may be used to detect the position of the selector shaft 203 relative to a fixed point such as the motor mounting 204 or relative to the housing of the transmission 205. The position sensor 206 may operate by use of a potentiometer, in which case the selector shaft 203 rotates relative to the potentiometer changing the current flow through the potentiometer. In the case of a Hall effect sensor, the selector shaft 203 may have mounted upon it permanent magnets or may comprise a portion which has been magnetized so that it generates a magnetic field which is detected by the Hall effect sensor. Changes in the magnetic field may be outputted by the Hall effect sensor as a digital signal or as an analog voltage.

The position sensor 206 may also be used to determine the torque experienced by the selector shaft 203, when positioned on a portion of the selector shaft 203 that is subject to mechanical strain caused by torque. In one embodiment, the position sensor 206 is located between the driving gears and the selector drum, which is subject to mechanical strain caused by torque.

When the position sensing means are used in conjunction with mechanical biasing means of the system, it is possible for the system to adapt over time to account for wear, and also to adapt on the fly to address transient dangerous gear jam conditions. In an embodiment which includes a biasing means for mechanically biasing the selector drum 104 into one of a number of gear positions, when the controller has actuated the control motor 201 and driven the selector drum 104 into one of those desired positions, as perceived by the controller in accordance with a set of pre-programmed control positions, the control motor 201 has completed its actuation into the next shift position. If the pre-programmed control position is out of calibration, the cam indexer 116 will apply a correcting torque to the selector drum 104 bringing it to the mechanically correct position. By monitoring the position of the selector drum 104 via the position sensor 206 the controller can detect when the pre-programmed control positions have fallen out of calibration. The control system can therefore alter the stored motor control positions to approach the settled values of the mechanical system. It may accomplish this by calculating the difference between the motor position coordinates following a gear change and the stored motor position coordinates corresponding with that gear, and modifies the stored motor position coordinates if the difference is greater than a predefined threshold.

In operation, the control motor 201 drives the selector shaft gears 202 which in turn drive the selector shaft 203 to one of the pre-programmed positions, overcoming the resistance of friction and the indexer biasing means to shift the system into an adjacent gear.

Figure 3A:
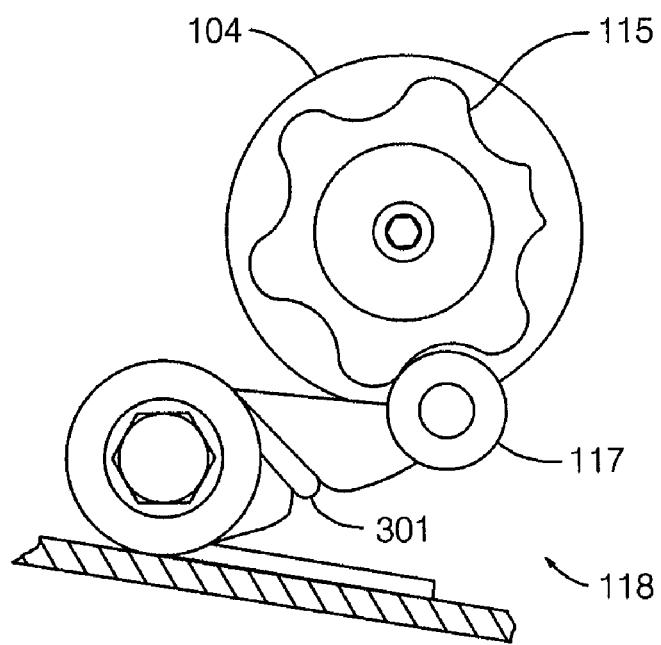
FIG. 3A is a side view of an indexing means slightly out of ideal position according to an embodiment of the invention.
Figure 3B:
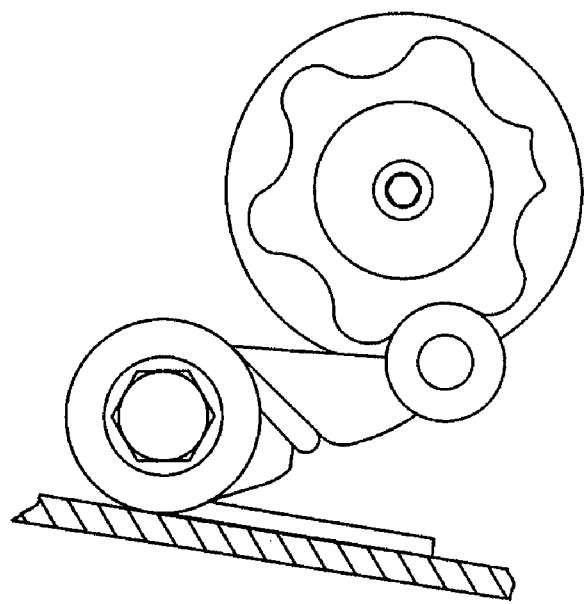
FIG. 3B is a side view of an indexing means in a settled position according to an embodiment of the invention.

FIGS. 3a & 3b depict a mechanical biasing means comprising a cam sprocket 115 having a series of indentations and a cam follower 118 hinged at one end and having a wheel or cam follower 117 at the other end and a spring 301 for biasing the cam follower 118 against the cam sprocket 115. When in gear, the cam follower 118 will settle into one of the indentations. As previously mentioned, a control system can detect if it has driven the selector drum 104 into a position where the cam follower 118 is not quite settled into one of the impressions because the selector drum 104 will experience torque caused by the biased cam follower 118 against the surface of the cam sprocket 115 to settle it into position. This permits the system to continually calibrate itself relative to the mechanical environment, which is necessary because, as mentioned, the system may over time become imprecise as wear and sensor degradation occurs.

Figure 4:
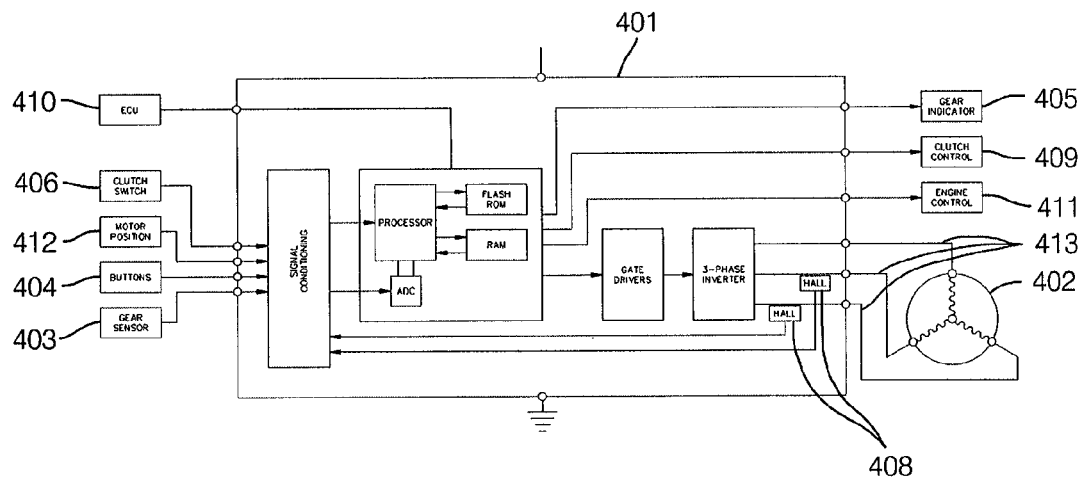
FIG. 4 is a schematic view of the system depicting the controller and its connection to other elements according to an embodiment of the invention.

FIG. 4 depicts a schematic of the system showing a controller 401 interfaced with a number of elements. The controller 401 controls a motor 402, preferably a brushless DC motor, the motor 402 may be a three phase motor permitting AC control of the motor 402 and may also in such an environment include a motor position sensor 412, which may be inherent in the design of the motor 402, or separate. The system may also comprise a gear position sensor 403, separate and independent from any sensing capabilities in the motor 402, the gear position sensor 403 will sense the position of the selector drum and measure the position of the selector drum directly. The system may also comprise a gear position display 405 to display the current gear based on inputs from the gear position sensor 403 or the motor 402 and is determined by the gear controller 401.

The controller may comprise hardware, electronic or electrical circuitry and/or a processor and storage for executing software. Software is executable statements and instructions stored in a memory for execution by a processor. A memory may include any static, transient or dynamic memory or storage medium, including without limitation read-only memory (ROM) or programmable ROM, random access registers memory (RAM), transient storage in registers or electrical, magnetic, quantum, optical or electronic storage media. A processor includes any device or set of devices, howsoever embodied, whether distributed or operating in a single location, that is designed to or has the effect of carrying out a set of instructions, but excludes an individual or person. A system implemented in accordance with the present invention may comprise a computer system having memory and a processor to execute the software.

The system may also comprise some sort of user interface, such as a shift button array 404 in a semi-automatic embodiment, and it may also be used in conjunction with other controls known in the art.

The controller 401 may control an automatic or semi-automatic clutch 409 in conjunction with the system in a preferred embodiment. A semi-automatic or automatic clutch system 409 may be directly controlled by the gear controller 401 such that the controller 401 both actuates the clutch and shifts the gears in response to a single input from a rider or in response to an automatic control strategy programmed into the controller 401, or other electronic control units (ECUs) 410 located on the vehicle.

The controller 401 may be directly connected with the vehicle's sensors, or may communicate with ECUs 410 or an onboard computer system through direct connection or a bus. A commonly used standard for vehicle communication is a bus implementing the CAN multi-master broadcast serial bus standard, but any electronic or electrical communication means may be used. Though such communication means, or directly using a separate bus or buses 411, the controller 401 may access and use any of the information produced by the vehicle's sensors, including wheel speed, throttle position, ignition timing, etc. This information may be used to control the transmission to optimize shifting speed and timing, and to prevent damage.

For example, the controller 401 may sense the current wheel speed via a wheel speed sensor which permits it to control which gears may be shifted into by the rider, to prevent errors by the rider which may damage the transmission or engine.

The controller 401 may also receive inputs from the ignition system through the wiring harness, such as the position of the stop switch, the position of the throttle and the speed of the engine.

The system may also be adapted to connect to other control systems on the vehicle such as any existing control systems that deal with engine control, braking, traction control or similar automated or semi-automated systems to coordinate shifting with those systems. This coordination would have the benefit of preventing shifts that could lead to unsafe conditions.

In the preferred embodiment, if the shift attempt causes the gears to interfere or clash, the shift would not initially proceed. In such a circumstance, the torque sensor, in this case two Hall effect current sensors 408 placed adjacent to the motor power lines 413, would measure significant torque, by way of increased current flow, and the controller 401 could change the speed, target position, or applied torque of the control motor 402 to allow the transient condition to clear so that the selector drum could proceed into the desired position. This mechanism allows detection of transient gear interference conditions and prevention of damage to the control motor 402 and/or the transmission that may be otherwise caused by driving the transmission into a position where it mechanically cannot go.

Under such conditions, the controller 401 may respond in a number of different ways to resolve the gear interference. The controller 401 may adopt a position control, speed control, or torque control strategy to overcome the interference.

Figure 5:
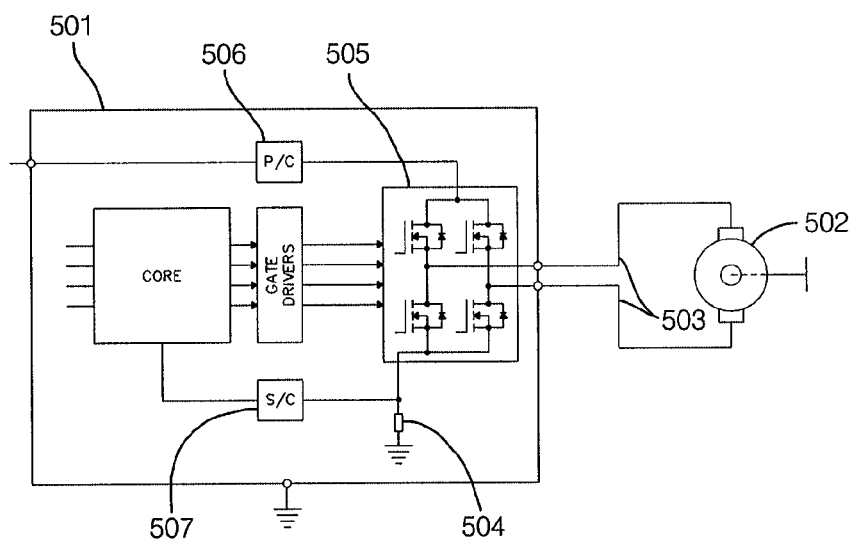
FIG. 5 is a schematic view of a DC brushed motor, its driving circuits, and current sensing circuit according to an embodiment of the invention.

In one embodiment, shown in FIG. 5, the means used to sense torque involves detecting current in the motor power lines 503. The torque sensor in controller 501 may comprise an in-line resistor 504 and one or more Hall effect sensors to detect changes in current on the transmission lines 503 as consumed or generated by the control motor 502. Current sensing can be used to detect power and torque as experienced by the control motor 502 when the voltage applied to the control motor 502 is known, as it is in the case of an electrically controlled system. A controller 501, upon measuring the changes in current as compared to the input voltage, can calculate the torque experienced by the control motor 502 and can adjust it appropriately to prevent damage to the transmission. In this embodiment, the control motor 502 is controlled by the controller 501 though a set of switches 505 implemented using MOSFET circuitry. Other current sensing means may also be used, such as a dynamic transformer affixed to either the control motor or the selector shaft. The control motor 502 control means may also include a power conditioning unit 506 for conditioning the electrical power delivered to the control motor 502 for voltage, polarity, reverse polarity protection, and switching noise suppression, and delivers the power within the optimum parameters for the control motor 502. The torque sensing means may also comprise a control signal conditioning unit 507 for filtering control signal noise, and providing amplification or attenuation of the control signals to drive the control motor 502

Figure 6A:
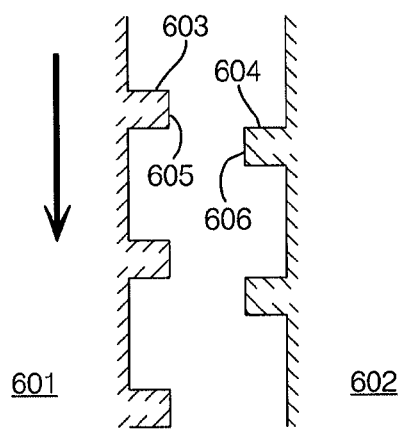
FIG. 6a is a diagram showing gear dogs prior to engagement.
Figure 6B:
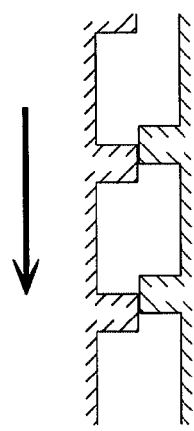
FIG. 6b is a diagram showing gear dogs in an interference state.
Figure 6C:
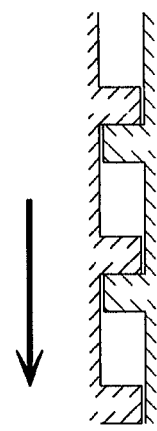
FIG. 6c is a diagram showing gear dogs in an engaged state.

As shown in FIGS. 6a-6c, gear interference, or jams, typically arise when the sliding gear 601 is slid towards the free spinning gear 602. If outward surfaces 605 of the dog teeth of the sliding gear 603 impact the outward surfaces 606 of the dog teeth of the free spinning gear 604 when slid together, the dog teeth 603 604 will not engage, causing a jam. This gear dog interference causes the lateral force being applied by the shift forks to quickly increase, which is converted to torque seen at the selector drum based on the cam profile of the grooves cut into the selector drum. Once the jam is cleared or under normal operation, the dog teeth 603 604 engage, driving the free spinning gear together with the sliding gear.

There is typically a specific set of selector drum positions where jams can occur. These positions are particular to the shape of the selector drum and transmission, and are typically where the drum is moving the dog teeth of the gears together but not overlapping or engaging. Outside of these particular set of drum positions, high current readings may be measured, but are associated with other transient loads that are not related to jamming, such as loads caused by starting up the vehicle and braking.

Figure 7:
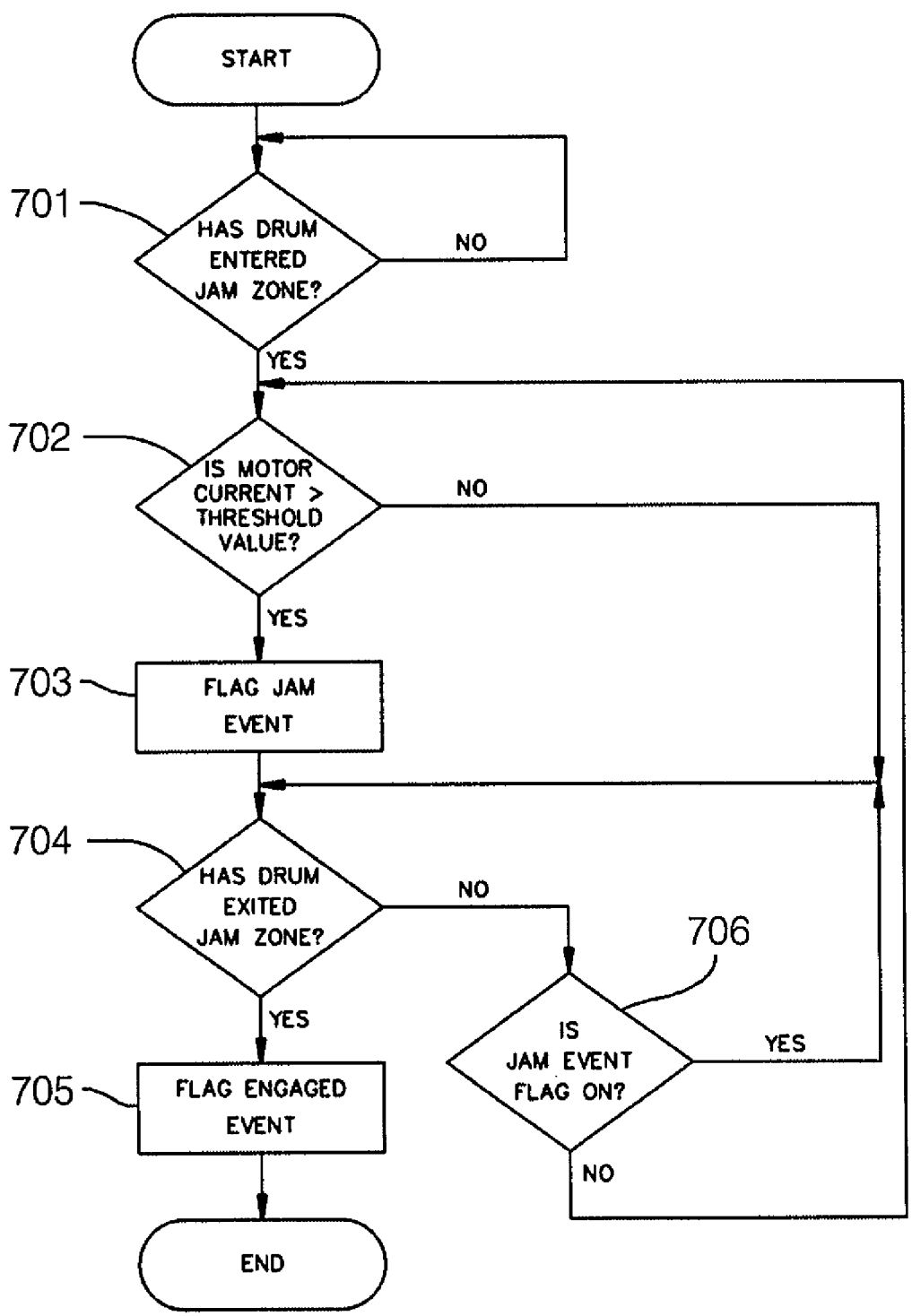
FIG. 7 is a flowchart showing controller logic according to an embodiment of the invention.

In FIG. 7, an embodiment of the invention is shown depicting the logic of the controller during a shift to detect a jam event. The process starts by detecting whether the selector drum has entered one of the positions where a jam is possible (a "jam zone") 701. The system may detect whether the selector drum has entered a jam zone by using a position sensor. The position sensor may be coupled directly to the selector drum, or may be integrated into the control motor. In the latter case, the position of the selector drum may be inferred from the number of revolutions that the control motor has made since the shift started. The system may also deem the selector drum to be in a jam zone after a predetermined delay from the initiation of the shift.

If the gear selector is in a jam zone, the process measures whether the control motor is drawing current in excess of a predefined threshold 702. The value of the predefined threshold 702 will depend on the system, and the current typically drawn by the control motor during a jam event, as determined by modeling or experimentation, or based on previous jam events recorded by the controller. The process sets a jam event flag 703 should the current threshold be exceeded at any time while the drum is in a jam zone 702 704. Should the process detect that the jam event flag is on, the process may adopt a position control, speed control, or torque control strategy to resolve the interference dynamically during the shift. These control strategies are designed to shepherd the transmission out of the jam zone, either into the desired gear, or back out into the starting gear. A jam event flag status check 706 ensures the event is only flagged once. Once the drum has exited the jam zone, the process can set a gear engaged flag 705 to indicate that the gear is expected to engage successfully. Should the process detect that the gear engaged flag 705 is on the process may trigger external events such as clutch control or engine control. If the jam event flag 703 is set at the end of the process, the process may run a diagnostic routine to identify the cause of the jam, or adopting a position control, speed control, or torque control strategy to resolve the interference should it remain (for example, because the shift has failed entirely, and the drum has reverted to its starting position).

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. An apparatus for controlling a transmission of a vehicle, the transmission comprising an input shaft, an output shaft, at least two sets of gears which are selectively engageable, and a selector drum that when rotated selects a set of gears which engage to drive the output shaft from the input shaft, the apparatus comprising:
   a. a control motor which is mechanically connected to the selector drum to rotate the selector drum when actuated;
   b. a torque sensor which senses the torque applied to the selector drum by the control motor; and
   c. a controller for controlling the control motor based on signals received from the torque sensor to thereby control the engagement of a set of gears.

2. The apparatus of claim 1 wherein the control motor is connected to the selector drum by at least one set of spur gears, bevel gears, helical gears or hypoid gears, wherein the helix angle of the helical gears do not exceed 50 degrees.

3. The apparatus of claim 2 wherein the torque sensor comprises a current sensor that monitors current drawn by the control motor as an indication of torque applied by the control motor.

4. The apparatus of claim 3 wherein the current sensor comprises at least one Hall effect sensor proximate to the control motor power lines, the Hall effect sensor comprising a transducer for producing a digital or analog signal in response to changes in magnetic fields of the power lines.

5. The apparatus of claim 3 wherein the current sensor comprises at least one resistor connected in series with the control motor power lines, the current sensor monitoring for changes in voltage across at least one resistor.

6. The apparatus of claim 3 further comprising a gear position sensor positioned to detect the position of the selector drum relative to the transmission housing.

7. The apparatus of claim 6 wherein the controller stores a motor position coordinate for each position of the selector drum corresponding to an engaged set of gears.

8. The apparatus of claim 7 wherein the controller uses the position sensor to sense when the selector drum is in a position where gear interference is possible.

9. The apparatus of claim 8 wherein the controller uses the position sensor in combination with the torque sensor to determine the existence of gear interference.

10. The apparatus of claim 9 wherein the controller responds to detected gear interference by reversing the direction of the rotation of the control motor.

11. The apparatus of claim 9 wherein the controller responds to detected gear interference by stopping the control motor.

12. The apparatus of claim 9 wherein the controller responds to detected gear interference by reducing the power applied to the control motor.

13. The apparatus of claim 9 wherein the controller responds to detected gear interference by varying the power applied to the control motor as a function of torque applied to the selector drum as detected by the torque sensor.

14. The apparatus of claim 9 wherein the controller responds to detected gear interference by varying the power produced by the vehicle's engine.

15. The apparatus of claim 7 further comprising a mechanical biasing means for biasing the selector drum into a fixed number of gear positions, each gear position of the selector drum corresponding to an engaged set of gears that drive the output shaft from the input shaft.

16. The apparatus of claim 15 wherein the controller calculates the difference between the motor position coordinates following a gear change and the stored motor position coordinates corresponding with that gear, and modifies the stored motor position coordinates if the difference is greater than a predefined threshold.

17. The apparatus of claim 2 wherein the torque sensor is positioned to detect a change in torque on a selector shaft that is mechanically connected to the selector drum.

18. The apparatus of claim 17 wherein a portion of the selector shaft generates a magnetic field, and the torque sensor detects variations in the magnetic field.

19. The apparatus of claim 18 wherein the torque sensor and portion of the selector shaft form a rotary transformer.

20. The apparatus of claim 17 wherein a portion of the selector shaft is in electrical contact with the torque sensor, and the torque sensor detects variations in current or voltage in an electrical circuit comprising the torque sensor and the portion of the selector shaft.

21. An apparatus for controlling a transmission of a vehicle, the transmission comprising an input shaft, an output shaft, at least two sets of gears which are selectively engageable, and a selector drum that when rotated selects a set of gears which engage to drive the output shaft from the input shaft, the apparatus comprising:
   a. a control motor which is mechanically connected to the selector drum to rotate the selector drum when actuated;
   b. a gear position sensor positioned to detect the position of the selector drum relative to the transmission housing;
   c. a torque sensor which senses the torque applied to the selector drum by the control motor; and
   d. a controller for controlling the control motor based on signals received from the torque sensor and the position sensor to thereby control the engagement of a set of gears.

22. The apparatus of claim 21 wherein the torque sensor comprises a current sensor that monitors current drawn by the control motor as an indication of torque applied by the motor.

23. A method of controlling the shifting of a transmission, the transmission comprising an input shaft, an output shaft, at least two sets of gears which are selectively engageable, a selector drum that when rotated selects a set of gears which engage to drive the output shaft from the input shaft, a control motor which is mechanically connected to the selector drum to rotate the selector drum when actuated, a torque sensor which senses the torque applied to the selector drum by the control motor, and a controller, the method comprising:
   a. actuating the control motor to initiate a shift by rotating the selector drum;
   b. detecting whether the selector drum has entered a jam zone;
   c. when the selector drum is in a jam zone:
      i. detecting whether the torque applied to the selector drum by the control motor exceeds a predetermined threshold using the torque sensor; and
      ii. varying the voltage, current or electrical power delivered to the control motor if the predetermined threshold is exceeded; and
   d. detecting whether the selector drum has exited a jam zone;
wherein the jam zone is at least one range of rotational positions of the selector drum where undesirable mechanical interference between the sets of gears can occur.

24. The method of claim 23 wherein the transmission further comprises a gear position sensor which senses the position of the selector drum relative to the transmission housing, and the method further comprises determining the entrance to a jam zone by comparison of the selector drum position to a predetermined threshold.

25. The method of claim 23 wherein the transmission further comprises a gear position sensor which senses the position of the selector drum relative to the transmission housing, and the method further comprises determining the exit from a jam zone by comparison of the selector drum position to a predetermined threshold.

* * * * *